US012566653B2

(12) United States Patent
Niboshi et al.

(10) Patent No.: US 12,566,653 B2
(45) Date of Patent: Mar. 3, 2026

(54) DATA PROCESSING SYSTEM, DATA PROCESSING METHOD, AND RECORDING MEDIUM

(71) Applicant: Hitachi, Ltd., Tokyo (JP)

(72) Inventors: Yoshihiro Niboshi, Tokyo (JP); Shinichiro Saito, Tokyo (JP); Takuya Habara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 31 days.

(21) Appl. No.: 18/584,685

(22) Filed: Feb. 22, 2024

(65) Prior Publication Data
US 2024/0345907 A1 Oct. 17, 2024

(30) Foreign Application Priority Data

Apr. 12, 2023 (JP) ................................ 2023-065236

(51) Int. Cl.
G06F 11/07 (2006.01)
(52) U.S. Cl.
CPC ...... G06F 11/0772 (2013.01); G06F 11/0793 (2013.01)
(58) Field of Classification Search
CPC .......................... G06F 11/0772; G06F 11/0793
See application file for complete search history.

(56) References Cited

U.S. PATENT DOCUMENTS

| | | | | |
|---|---|---|---|---|
| 9,847,926 B2 * | 12/2017 | Couture | ................. | H04L 43/10 |
| 2014/0281192 A1 * | 9/2014 | Gilda | .................... | G06F 3/0656 |
| | | | | 711/105 |
| 2019/0132384 A1 | 5/2019 | Ishii et al. | | |
| 2020/0192798 A1 * | 6/2020 | Natu | ........................ | G06F 12/12 |
| 2020/0341868 A1 * | 10/2020 | Carpenter | ........... | G06F 11/0709 |

FOREIGN PATENT DOCUMENTS

| | | |
|---|---|---|
| JP | 2001-142649 A | 5/2001 |
| JP | 6963465 B2 | 11/2021 |

* cited by examiner

*Primary Examiner* — Jigar P Patel
(74) *Attorney, Agent, or Firm* — Volpe Koenig

(57) ABSTRACT

A data processing system is provided, which executes processing for receiving data, storing the received data in a buffer, and outputting the data stored in the buffer to a predetermined data storage destination, the data processing system including one or more processors configured to: receive a reference cycle for referring to data in the data storage destination; determine an accumulation time, for which data stored in the buffer is held before being output to the data storage destination, to be a time equal to or shorter than the reference cycle, based on whether there is data loss by which data to be stored in the buffer cannot be stored in the buffer; and output data in the buffer to the data storage destination, in accordance with the determined accumulation time.

11 Claims, 11 Drawing Sheets

FIG. 1

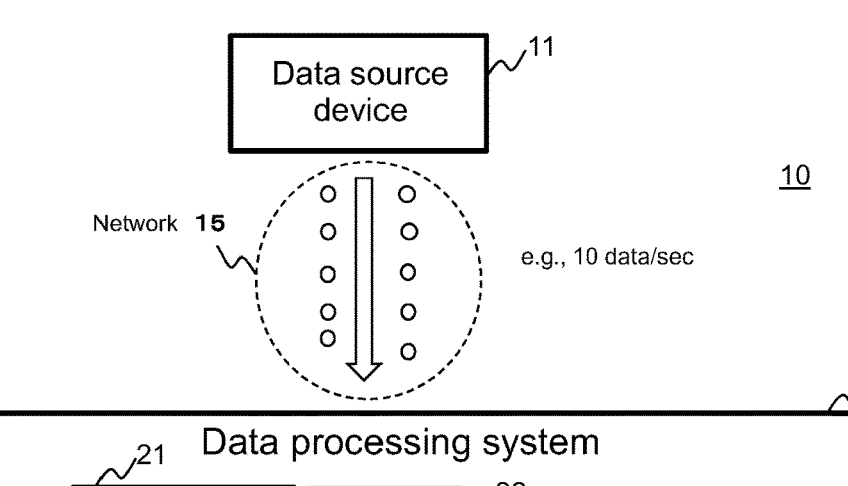

Data source device ~11

Network 15 e.g., 10 data/sec

10

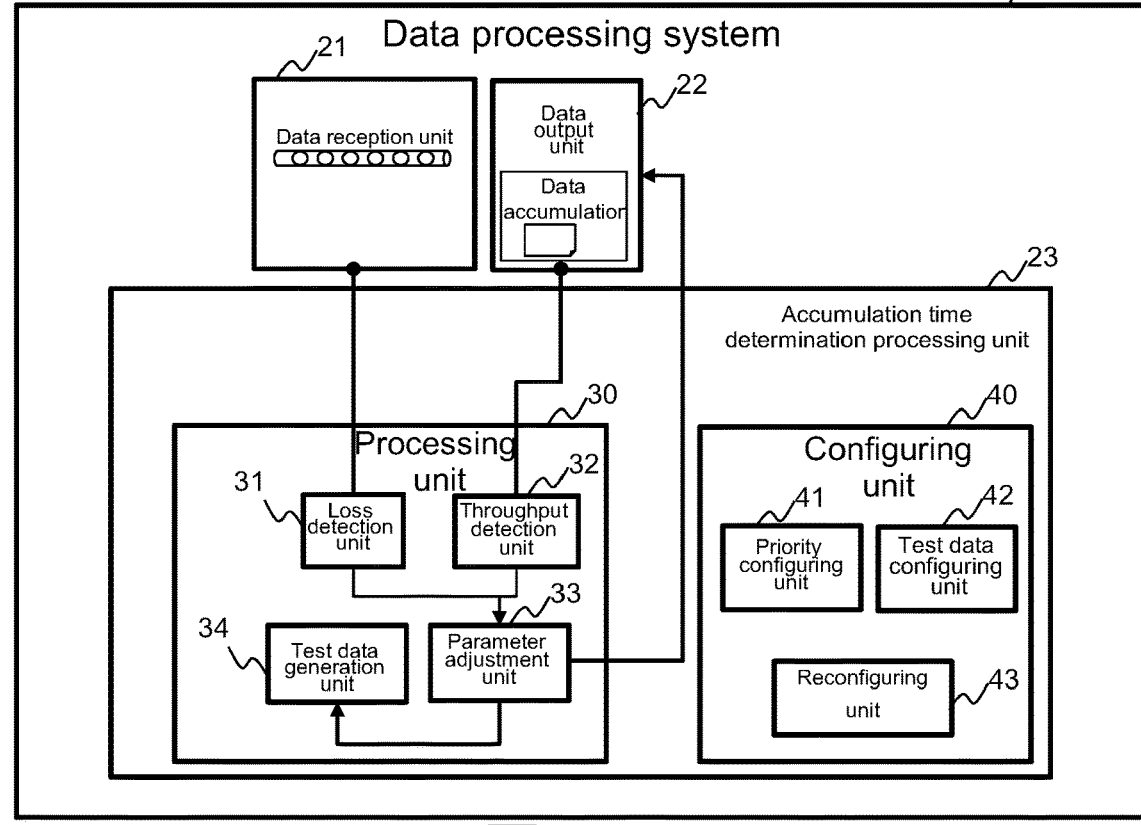

Data processing system ~20

~21 Data reception unit

Data output unit ~22

Data accumulation

Accumulation time determination processing unit ~23

Processing unit ~30

31 Loss detection unit

Throughput detection unit ~32

34 Test data generation unit

Parameter adjustment unit ~33

Configuring unit ~40

Priority configuring unit ~41

Test data configuring unit ~42

Reconfiguring unit ~43

Aggregation and registration e.g., 100 data/5 sec

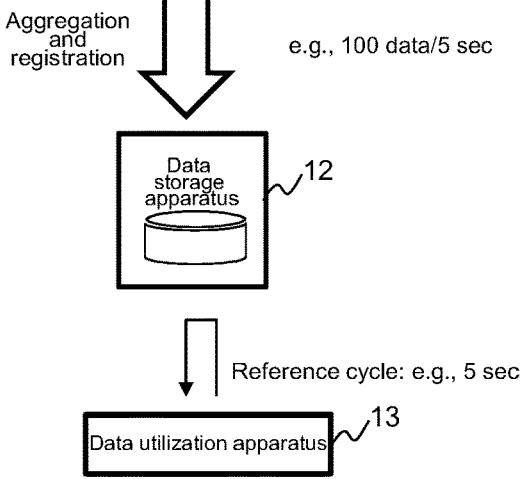

Data storage apparatus ~12

Reference cycle: e.g., 5 sec

Data utilization apparatus ~13

| accumulation time [51] | throughput value [52] | data loss Yes/No [53] |
|---|---|---|
| 7 | 95Mbyte/sec | No |
| 6 | 94Mbyte/sec | No |
| 5 | 93Mbyte/sec | No |
| 4 | 79.1Mbyte/sec | Yes |

| accumulation time | throughput value | data loss Yes/No |
|---|---|---|
| | 51 | 52 | 53 |
| 2 | 47.5Mbyte/sec | Yes |

FIG. 6

| accumulation time | throughput value | data loss Yes/No |
|---|---|---|
| 0 | 15.8Mbyte/sec | Yes |
| 1 | 31.6Mbyte/sec | Yes |
| 2 | 47.5Mbyte/sec | Yes |
| 3 | 63.3Mbyte/sec | Yes |
| 4 | 79.1Mbyte/sec | Yes |
| 5 | 95Mbyte/sec | No |

FIG. 9

| accumulation time | throughput value | data loss Yes/No | data transmittance |
|---|---|---|---|
| 2 | 47.5Mbyte/sec | Yes | 50% |

FIG. 11

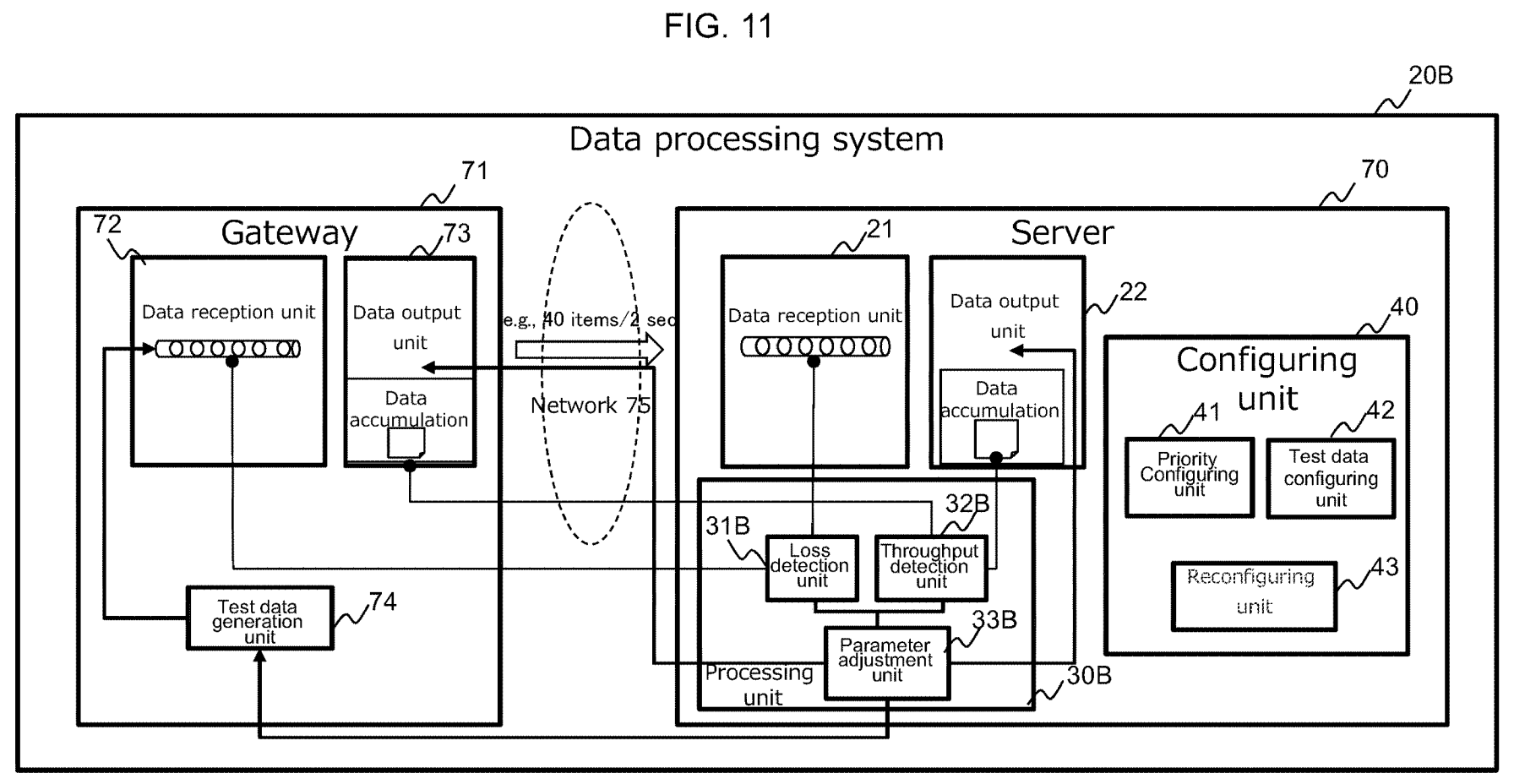

Data processing system

20B

70

Server

Configuring unit 40

Priority Configuring unit 41

Test data configuring unit 42

Reconfiguring unit 43

Data output unit 22

Data accumulation

Data reception unit 21

Throughput detection unit 32B

Loss detection unit 31B

Parameter adjustment unit 33B

Processing unit 30B

Network 75 e.g., 40 items/2 sec

Gateway 71

Data output unit 73

Data accumulation

Data reception unit 72

Test data generation unit 74

DATA PROCESSING SYSTEM, DATA PROCESSING METHOD, AND RECORDING MEDIUM

CROSS-REFERENCE TO RELATED APPLICATIONS

This application claims priority from Japanese Patent Application No. 2023-65236 filed Apr. 12, 2023. The entire content of the priority application is incorporated herein by reference.

BACKGROUND

The present disclosure relates to a technology for registering data of a data source in a data storage destination.

Data generated on site or the like is registered in a data storage destination such as a database, and processing such as visualization and analysis is performed using the data stored in the data storage destination.

For example, in a processing apparatus that executes processing for receiving generated data and registering the received data in a data registration destination, the overheads of the processing for registering the data in the data registration destination increase when the processing of registering to the data registration destination is performed sequentially each time data arrives. Thus, depending on the performance of the processing apparatus (e.g., buffer size, etc.), there is a risk that data may be lost (data loss) whereby data that arrives cannot be stored in the buffer due to the influence of the processing of registering to the data registration destination.

To address this, a technology for preventing data loss through improving the efficiency of the processing of registering to the data registration destination by aggregating data that arrives within a predetermined time (accumulation time) and registering the aggregated data in the data registration destination, for example, is known.

However, when the accumulation time is too long, storage of data to the data registration destination takes a longer time, and there is a risk that the real-time performance of processing at the data utilization destination, where data in the data registration destination is utilized, may be impaired.

For example, Japanese Patent Application Publication No. 2001-142649 discloses, as a technology for stream data that is difficult to manage due to time constraints, a technology in which an apparatus that processes stream data and non-stream data switches the request execution sequence in real-time such that processing is optimized, by comprising: two types of queues for requests provided with parameters; processing for planning the request execution sequence depending on the parameters; and processing for scanning the queues and executing optimal requests.

SUMMARY

As described above, when the accumulation time is too long, storage of data to the data registration destination takes a longer time, and there is a risk that the real-time performance of the processing in the data utilization destination, where the data stored in the data registration destination is utilized, may be impaired, but technologies regarding how to specifically configure the accumulation time are not known. The present invention has been made in view of the above circumstances, and an object of the invention is to provide a technology that is able to easily and appropriately configure the accumulation time of data to be registered in a data registration destination.

In order to achieve the above object, a data processing system according to one aspect is a data processing system is a data processing system executing processing for receiving data, storing the received data in a buffer, and outputting the data stored in the buffer to a predetermined data storage destination. The data processing system includes one or more processors configured to receive a reference cycle for referring to data in the data storage destination, determine an accumulation time, for which data stored in the buffer is held before being output to the data storage destination, to be a time equal to or shorter than the reference cycle, based on whether there is data loss by which data to be stored in the buffer cannot be stored in the buffer, and output data in the buffer to the data storage destination, in accordance with the determined accumulation time.

BRIEF DESCRIPTION OF THE DRAWINGS

FIG. 1 is an overall configuration diagram of an information processing system according to a first embodiment;

FIG. 2 is a configuration diagram of a list table according to the first embodiment;

FIG. 3 is a configuration diagram of a configuration screen according to the first embodiment;

FIG. 5 is a diagram showing an example of the state of the list table according to the first embodiment;

FIG. 6 is a diagram showing another example of the state of the list table according to the first embodiment;

FIG. 9 is a configuration diagram of a list table according to the second embodiment;

FIG. 11 is a configuration diagram of a data processing system according to a modification.

DETAILED DESCRIPTION

Figure 4:
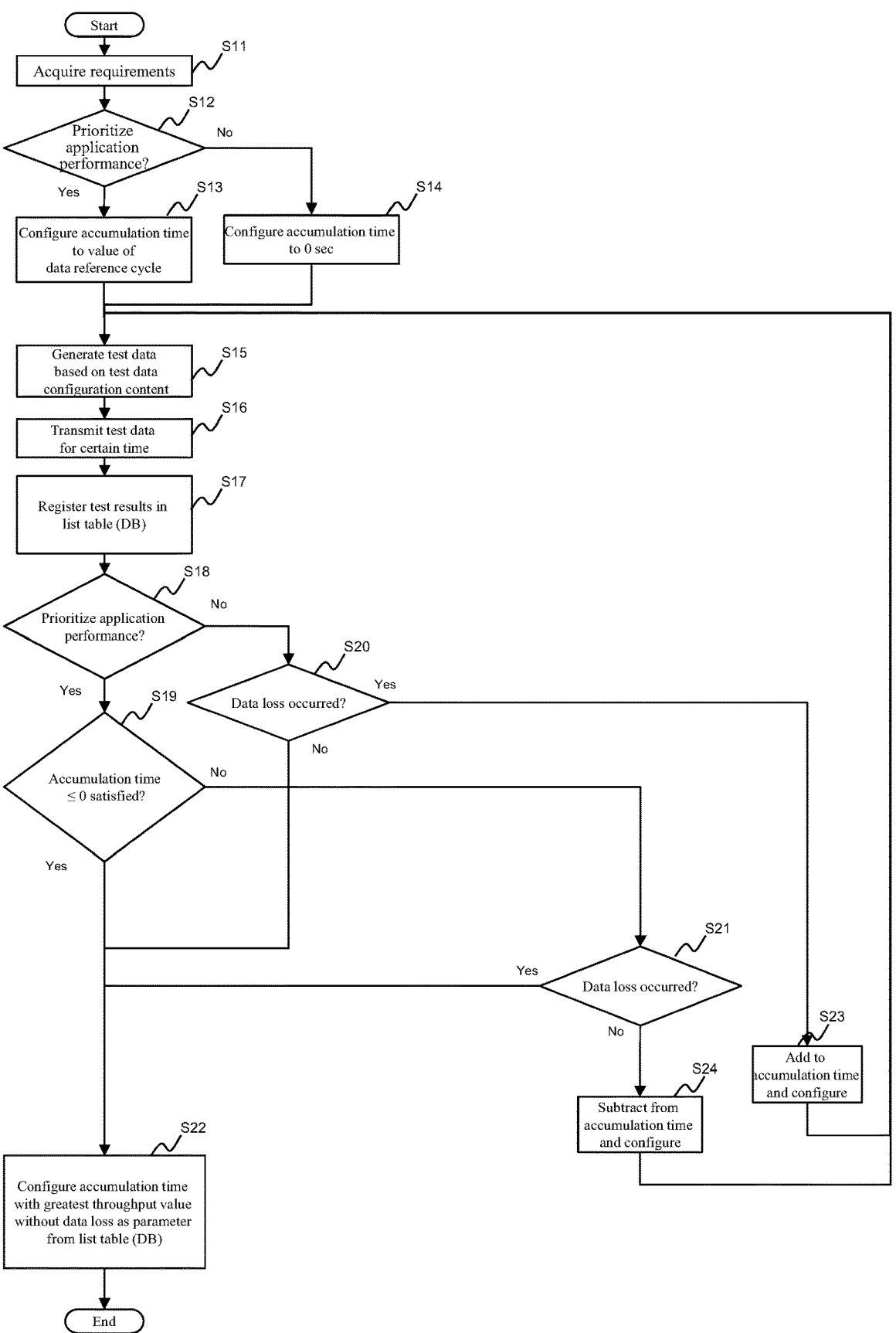
FIG. 4 is a flowchart of accumulation time configuring processing according to the first embodiment.

Embodiments will be described with reference to the drawings. Note that the embodiments described below do not limit the invention according to the claims, and not all of the elements described in the embodiments and combinations thereof are essential to means for solving the problem of the invention.

FIG. 1 is an overall configuration diagram of an information processing system according to a first embodiment.

An information processing system 10 includes a data source device 11, a data processing system 20, a data storage apparatus 12, and a data utilization apparatus 13. The data source device 11 and the data processing system 20 are coupled to each other via a network 15.

The data source device 11 is a device that serves as a source of data to be stored in the data storage apparatus 12. The data source device 11 may, for example, include a sensor that detect various states. The data source device 11 sequentially transmits data to the data processing system 20.

The data storage apparatus 12 is an example of a data storage destination, such as a database, for example, and stores data of the data source device 11 in a utilizable manner.

The data utilization apparatus 13 executes various processing, with reference to the data stored in the data storage apparatus 12. For example, the data utilization apparatus 13 executes processing with reference to data required in processing at a predetermined reference cycle (e.g., 5 seconds).

The data processing system 20 executes processing for storing data that is transmitted from the data source device 11 in the data storage apparatus 12.

The data processing system 20 includes a data reception unit 21, a data output unit 22, and an accumulation time determination processing unit 23. The data reception unit 21 performs processing for receiving data (storage target data) transmitted from the data source device 11 and storing the received data in a buffer. The data output unit 22 transmits the data stored in the buffer to the data storage apparatus 12 in accordance with the configuration of the time for which data is accumulated before being transmitted (accumulation time).

The accumulation time determination processing unit 23 is a functional unit that executes accumulation time determination processing (see FIG. 4) for determining the accumulation time of the data of the data output unit 22, and includes a processing unit 30 and a configuring unit 40.

Figure 3:
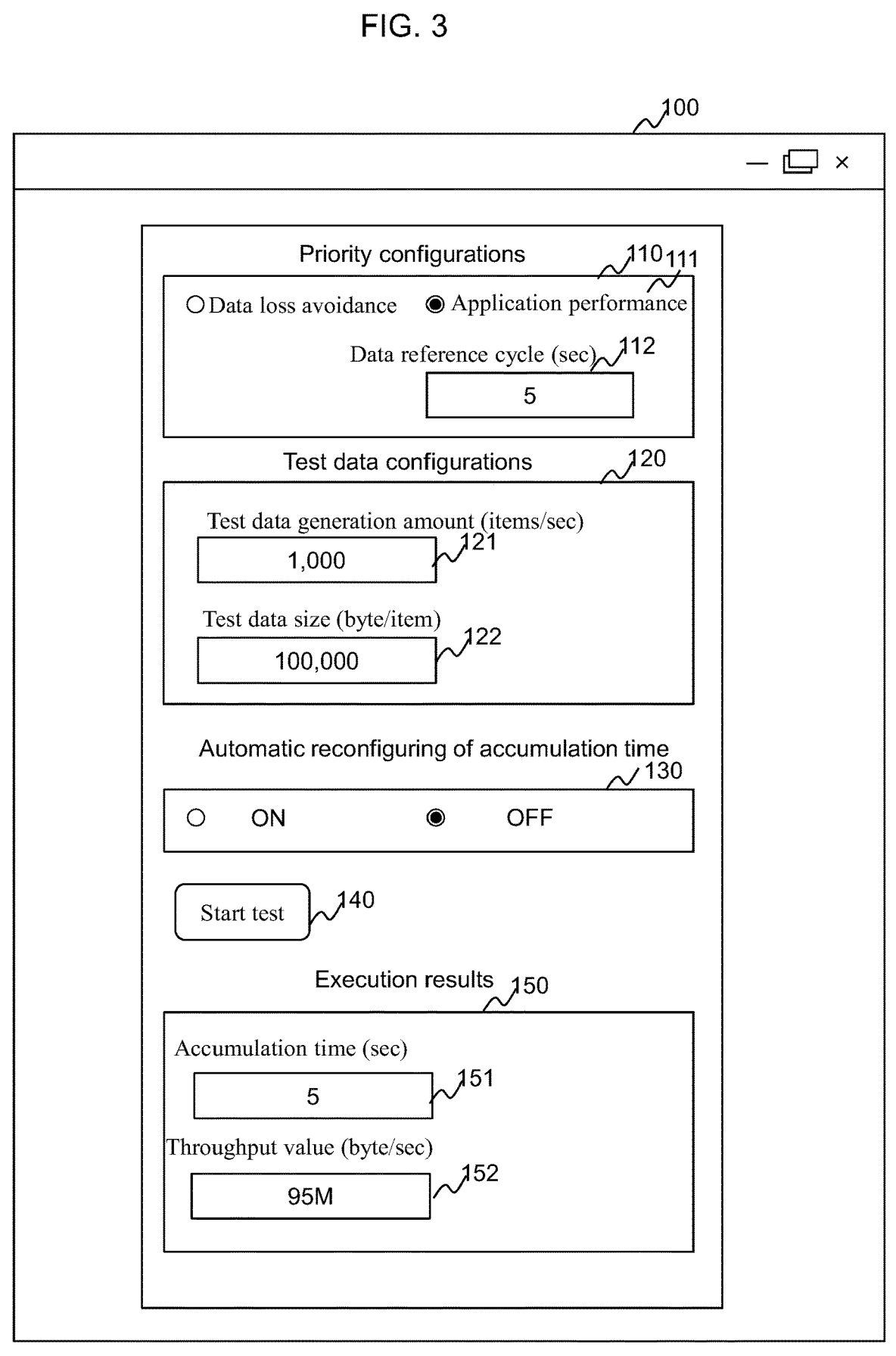

The configuring unit 40 includes a priority configuring unit 41, a test data configuring unit 42, and a reconfiguring unit 43. The priority configuring unit 41 configures a priority of the accumulation determination processing in a parameter adjustment unit 33, in accordance with configuration on a configuration screen 100 (see FIG. 3) described later. The test data configuring unit 42 configures the configurations of test data to be generated by a test data generation unit 34, in accordance with the configurations on the configuration screen 100. If reconfiguration of the accumulation time is configured, the reconfiguring unit 43 performs processing for causing the accumulation time determination processing to be executed again.

The processing unit 30 includes a loss detection unit 31, a throughput detection unit 32, the parameter adjustment unit 33, and the test data generation unit 34. The loss detection unit 31 detects the occurrence of data loss where data from the data source device 11 cannot be stored in the buffer by the data reception unit 21. The throughput detection unit 32 detects the throughput of data storage to the data storage apparatus 12 by the data output unit 22. The parameter adjustment unit 33 executes accumulation time determination processing for adjusting the parameter (data accumulation time) of the data output unit 22. The test data generation unit 34 performs processing for generating test data to be used in the accumulation time configuring processing in accordance with the test data configurations and passing the test data to the data reception unit 21.

Next, a list table that is generated in the accumulation time determination processing will be described.

FIG. 2 is a configuration diagram of the list table according to the first embodiment.

A list table 50 includes an entry for each accumulation time (candidate accumulation time) used in testing of the accumulation time configuring processing. The entry of the list table 50 includes fields of an accumulation time 51, a throughput value 52, and a data loss Yes/No 53. A candidate accumulation time corresponding to the entry is stored in the accumulation time 51. The throughput of the data output unit 22 in the case where the candidate accumulation time corresponding to the entry is configured is stored in the throughput value 52. Whether or not data loss occurred in the data reception unit 21 in the case where the candidate accumulation time corresponding to the entry is configured is stored in the data loss Yes/No 53.

Next, the configuration screen 100 will be described.

FIG. 3 is a configuration diagram of a configuration screen according to the first embodiment.

The configuration screen 100 is a screen for configuring various information required in the accumulation time determination processing and displaying execution results of the accumulation time determination processing, and is, for example, displayed on a display device such as a display coupled to the data processing system 20 or a display device of an information processing apparatus connected to the data processing system 20 via a network, by a processor 81 described later that executes a data processing program.

The configuration screen 100 includes a priority configurations area 110, a test data configurations area 120, an automatic reconfiguring area 130, a test start button 140, and an execution results area 150.

The priority configurations area 110 includes a priority button display area 111 and a reference cycle configuring area 112. The priority button display area 111 is an area for configuring the priority for configuring the accumulation time. Radio buttons for selecting whether to prioritize avoidance of loss of data transmitted from the data source device 11 (data loss avoidance) or whether to prioritize performance of the application that uses the data in the data utilization apparatus (application performance) are displayed in the priority button display area 111. The reference cycle configurations area 112 is an area for configuring the reference cycle for referencing data stored in the data storage apparatus in the application in the case of prioritizing application performance.

The test data configurations area 120 includes a test data generation amount configuration area 121 and a test data size configuration area 122. The test data generation amount configuration area 121 is an area for configuring the number of data (item count) per unit time of test data that simulates data arriving from the data source device 11. The test data size configuration area 122 is an area for configuring the size of test data.

The automatic reconfiguration area 130 is an area in which radio buttons for configuring whether to automatically reconfigure the accumulation time are displayed.

The test start button 140 is a button for instructing to start accumulation time configuring processing that utilizes the test data, and the accumulation time configuring processing is started when the test start button 140 is depressed.

The execution results area 150 includes an accumulation time display area 151 and a throughput value display area 152. The accumulation time display area 151 is an area for displaying the accumulation time configured by the accumulation time configuring processing. The throughput value display area 152 is an area for displaying the throughput value for when storing data in the data storage apparatus 12 in the case where the accumulation time configured by the accumulation time configuring processing is used.

Next, processing operations by the data processing system 20 will be described.

FIG. 4 is a flowchart of the accumulation time configuring processing according to the first embodiment.

The accumulation time configuring processing is executed in the case where the test start button 140 is depressed on the configuration screen 100, or where automatic reconfiguration is configured in the parameter adjustment unit 33 and the occurrence of data loss of a predetermined frequency or more is detected by the loss detection unit 31 after the processing is started using the determined accumulation time.

First, the configuring unit 40 acquires the various requirements configured on the configuration screen 100, and configures the configurations of the processing unit 30 in accordance with the acquired requirements (S11). Specifically, the priority configuring unit 41 configures the priority configured on the configuration screen 100 in the parameter adjustment unit 33, the test data configuring unit 42 configures the test data requirements configured on the configuration screen in the test data generation unit 34, and the reconfiguring unit 43 configures automatic reconfiguration in the parameter adjustment unit 33 in the case where automatic reconfiguration is configured on the configuration screen 100.

Next, the parameter adjustment unit 33 determines whether application performance is configured to be prioritized (S12).

As a result, if application performance is configured to be prioritized (S12: Yes), the parameter adjustment unit 33 configures the accumulation time of the data output unit 22 to the data reference cycle on the configuration screen (S13), and advances the processing to step S15.

On the other hand, if application performance is not configured to be prioritized (S12: No), the parameter adjustment unit 33 configures the accumulation time of the data output unit 22 to 0 seconds (S14), and advances the processing to step S15.

In step S15, the parameter adjustment unit 33 causes the test data generation unit 34 to start generating test data in accordance with the test data configuration contents.

Next, the parameter adjustment unit 33 causes the test data generation unit 34 to generate test data and transmit the generated test data to the data reception unit 21 for a certain time (S16). The data reception unit 21 thereby executes processing for receiving the transmitted data and storing the data in the buffer, and the data output unit 22 executes processing for outputting the data stored in the buffer to the data storage apparatus 12 in accordance with the configured accumulation time.

While the data reception unit 21 and the data output unit 22 are thus performing processing, the loss detection unit 31 detects whether or not data loss has occurred in the data reception unit 21 and notifies the parameter adjustment unit 33 of the detection result, and the throughput detection unit 32 detects the throughput of the data output unit 22 and notifies the parameter adjustment unit 33 of the detected throughput.

Next, the parameter adjustment unit 33 registers the test results obtained using the test data, that is, information on the configures accumulation time, the throughput, and whether or not data loss occurred, in the list table 50 (S17).

Next, the parameter adjustment unit 33 determines whether application performance is configured to be prioritized (S18), and if application performance is configured to be prioritized (S18: Yes), advances the processing to step S19, whereas if application performance is not configured to be prioritized (S18: No), the parameter adjustment unit 33 advances the processing to step S20.

In step S19, the parameter adjustment unit 33 determines whether "accumulation time equal to or less than 0" is satisfied, and, if satisfied (S19: Yes), determines one of the accumulation times without data loss from the list table 50 as the accumulation time to actually be used and configures the determined accumulation time in the data output unit 22 (S22), and thereafter ends the processing. Here, the accumulation time to actually be used may, for example, be the shortest accumulation time, in the case where application performance is configured to be prioritized, and may be the longest accumulation time (same time as reference cycle), in the case where there are no accumulation times without data loss. Also, the parameter adjustment unit 33 may display the determined accumulation time in the execution results area 150 of the configuration screen 100.

On the other hand, if "accumulation time equal to or less than 0" is not satisfied (S19: No), the parameter adjustment unit 33 advances the processing to step S21.

In step S20, the parameter adjustment unit 33 determines whether or not data loss has occurred, and if data loss has not occurred (S20: No), advances the processing to step S22, whereas if data loss has occurred (S20: Yes), the parameter adjustment unit 33 adds (e.g., +1) to the accumulation time configured in the data output unit 22 and configures the resultant accumulation time (S23), and thereafter advances the processing to step S15.

In step S21, the parameter adjustment unit 33 determines whether or not data loss has occurred, and if data loss has not occurred (S21: No), subtracts (e.g., −1) from the accumulation time configured in the data output unit 22 and configures the resultant accumulation time (S24), and thereafter advances the processing to step S15, whereas if data loss has occurred (S21: Yes), the parameter adjustment unit 33 advances the processing to step S22.

Next, some examples of the list table in the case where the accumulation time configuring processing has been performed and the accumulation time determined in each case will be described with reference to FIGS. 2, 5, and 6. FIG. 5 is a diagram showing an example of the state of the list table according to the first embodiment, and FIG. 6 is a diagram showing another example of the state of the list table according to the first embodiment.

The list table in FIG. 2 is an example of the case where application performance is configured to be prioritized and the reference cycle is configured to 7 seconds, the list table in FIG. 5 is an example of the case where application performance is configured to be prioritized and the reference cycle is configured to 2 seconds, and the list table in FIG. 6 is an example of the case where application performance is not configured to be prioritized, that is, data loss avoidance is configured to be prioritized.

In the case where application performance is configured to be prioritized and the reference cycle is configured to 7 seconds, entries in which the accumulation time is from 7 seconds, which is the reference time, to 4 seconds, which is the time at which data loss occurred, are stored in the list table 50, as shown in FIG. 2, as a result of the accumulation time configuring processing. In this case, for example, 5 seconds, which is the shortest accumulation time at which data loss does not occur, is determined as the accumulation time to be used. Data can thereby be stored in the data storage apparatus 12 at an accumulation time equal to or shorter than the reference time of the data utilization apparatus 13 without resulting in data loss, and the real-time performance of the data utilization apparatus 13 can be appropriately maintained.

Also, in the case where application performance is configured to be prioritized and the reference cycle is configured to 2 seconds, processing is started with the accumulation time configured to the reference time of 2 seconds, but because data loss occurs, an entry in which the accumulation time is 2 seconds is the only entry stored in the list table 50, as shown in FIG. 5, as a result of the accumulation time configuring processing. In this case, 2 seconds, which is the same time as the reference cycle, is determined as the accumulation time to be used. Although data loss occurs, data can thereby be stored in the data storage apparatus 12 at an accumulation time equal to the reference cycle of the data utilization apparatus 13, and impairment of the real-time performance in the data utilization apparatus 13 can be suppressed.

Also, in the case where application performance is not configured to be prioritized, processing is started with the accumulation time configured to 0 seconds, and entries up to 5 seconds, which is the time at which data loss no longer occurs, are stored in the list table 50, as shown in FIG. 6. In this case, 5 seconds, which is the shortest time at which data loss does not occur, is determined as the accumulation time to be used. Data can thereby be stored in the data storage apparatus 12 without resulting in data loss.

Next, an example of the hardware configuration of the data processing system 20 will be described.

Figure 7:
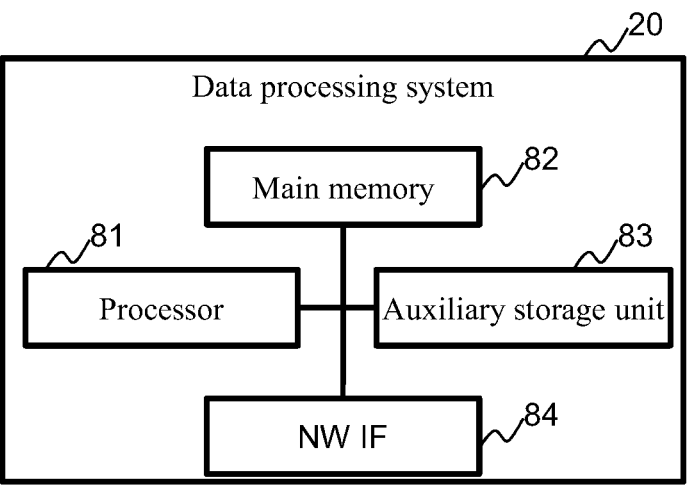
FIG. 7 is a hardware configuration diagram of a data processing system according to the first embodiment.

FIG. 7 is a hardware configuration diagram of the data processing system according to the first embodiment.

The data processing system 20 is, for example, a computer such as a PC (Personal Computer) or a general-purpose server, and includes a processor 81, a main memory 82, an auxiliary storage unit 83, and a network interface (NW IF) 84.

The NW IF 84 is, for example, an interface such as a wired LAN card or a wireless LAN card, and communicates with other apparatuses (data source device 11, data storage apparatus 12, etc.) via the network 15 or the like.

The processor 81 is, for example, a CPU (Central Processing Unit), and executes various processing in accordance with programs stored in the main memory 82 and/or the auxiliary storage unit 83.

The main memory 82 is, for example, a RAM (RANDOM ACCESS MEMORY), and stores programs that are executed by the processor 81 and required information (e.g., list table 50). Also, the main memory 82 may, for example, be used as a buffer for data received from the data source device 11.

The auxiliary storage unit 83 is, for example, a hard disk or a flash memory, and stores programs that are executed by the processor 81 and data that is utilized by the processor 81. In the present embodiment, the auxiliary storage unit 83 stores a data processing program for executing the accumulation time determination processing.

In the present embodiment, the data reception unit 21, the data output unit 22, the processing unit 30, and the configuring unit 40 are configured by the processor 81 executing the data processing program, for example.

Next, a data processing system according to a second embodiment will be described.

Figure 8:
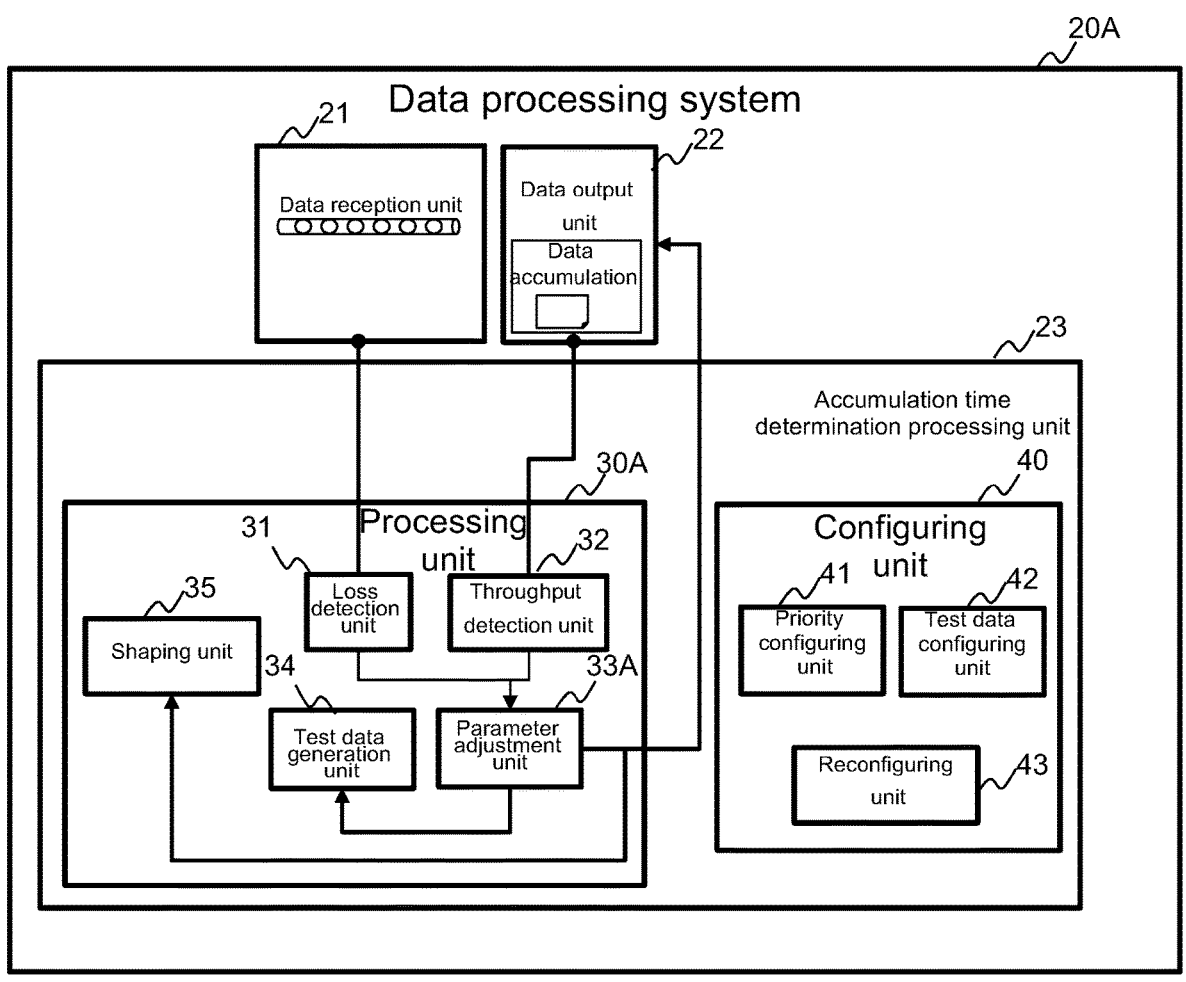
FIG. 8 is a functional configuration diagram of a data processing system according to a second embodiment.

FIG. 8 is a functional configuration diagram of the data processing system according to the second embodiment. Note that, in FIG. 8, portions similar to the data processing system 20 according to the first embodiment will be given the same reference symbols.

A data processing system 20A according to the second embodiment is provided with a processing unit 30A instead of the processing unit 30. The processing unit 30A, in comparison to the processing unit 30, is newly provided with a shaping unit 35, and with a parameter adjustment unit 33A instead of the parameter adjustment unit 33.

The shaping unit 35 performs thinning processing (shaping processing) for thinning input data, in accordance with a predetermined transmittance. The shaping unit 35, during normal operation, inputs data (storage target data) obtained by performing shaping processing on data received from the data source device 11 to the data reception unit 21, and, during testing (during accumulation time determination processing), inputs data (storage target data) obtained by performing shaping processing on data generated by the test data generation unit 34 to the data reception unit 21.

The parameter adjustment unit 33A executes accumulation time configuring processing (see FIG. 10) in which processing for adjusting the transmittance that is configured in the shaping unit 35 is added to the accumulation time configuring processing by the parameter adjustment unit 33.

Next, the list table that is generated in the accumulation time determination processing will be described.

FIG. 9 is a configuration diagram of a list table according to the second embodiment. Note that portions similar to the list table 50 shown in FIG. 2 are given the same reference symbols.

A list table 60 includes an entry for each accumulation time (candidate accumulation time) used in testing. The entry in the list table 60 includes the fields of an accumulation time 51, a throughput value 52, a data loss Yes/No 53, and a data transmittance 54. The rate (data transmittance) of input data that is input to the data reception unit 21 after undergoing shaping processing by the shaping unit 35 is stored in the data transmittance 54.

Next, processing operations by the data processing system 20A will be described.

Figure 10:
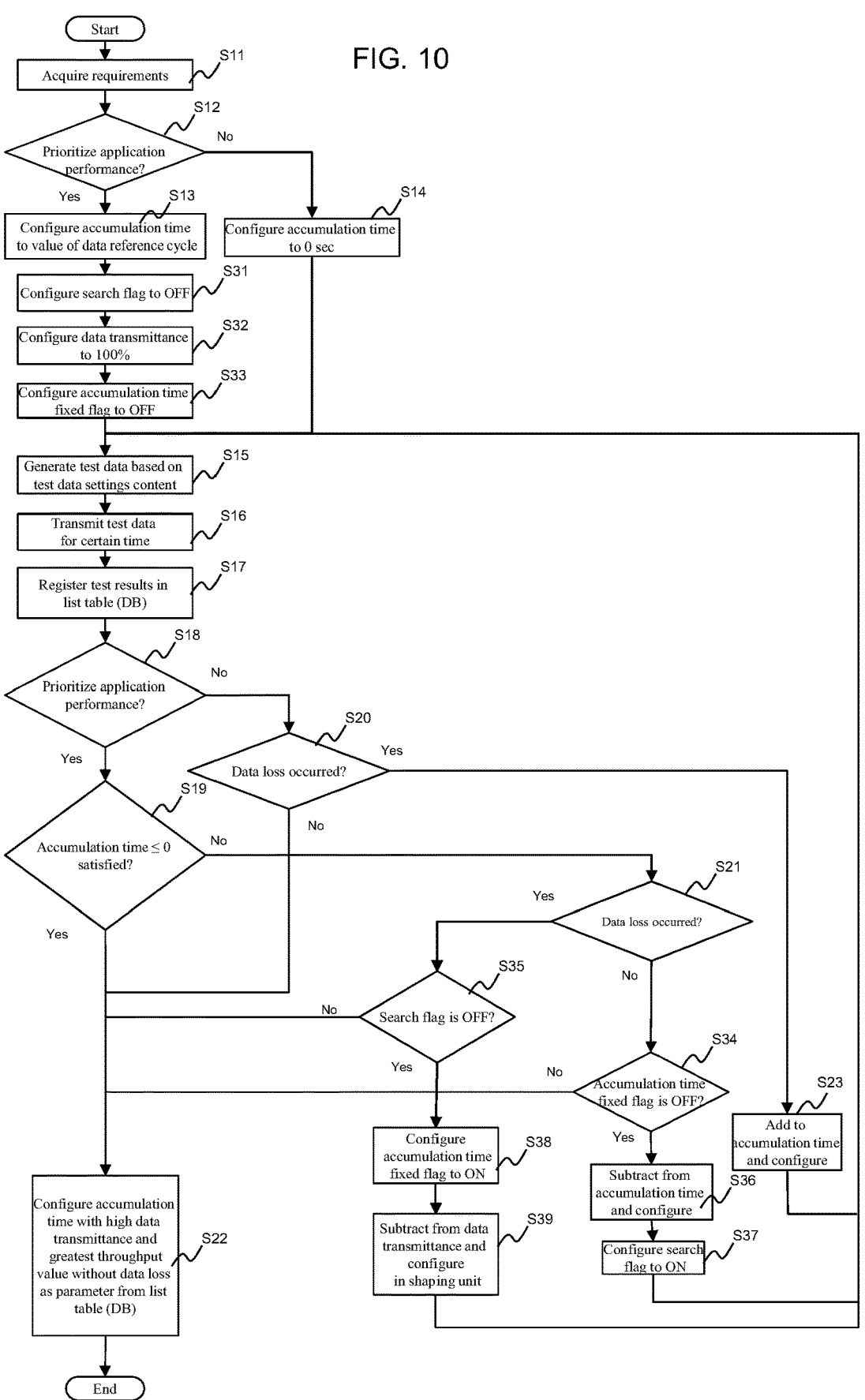
FIG. 10 is a flowchart of accumulation time configuring processing according to the second embodiment.

FIG. 10 is a flowchart of accumulation time configuring processing according to the second embodiment. Note that processing steps similar to the accumulation time configuring processing according to the first embodiment shown in FIG. 4 are given the same reference symbols and repetitive description may be omitted.

After performing step S13, the parameter adjustment unit 33A configures a search flag to OFF (S31), configures the data transmittance of the shaping unit 35 to 100% (S32), configures an accumulation time fixed flag to OFF (S33), and advances the processing to step S15. Here, the search flag indicates whether an accumulation time in which data loss has not occurred has been detected, and the accumulation time fixed flag indicates whether to change the accumulation time.

In step S21, if data loss has not occurred (S21: No), the parameter adjustment unit 33A advances the processing to step S34, whereas if data loss has occurred (S21: Yes), the parameter adjustment unit 33A advances the processing to step S35.

In step S34, the parameter adjustment unit 33A determines whether the accumulation time fixed flag is OFF. If the accumulation time fixed flag is not OFF (S34: No), this means that the accumulation time is not to be changed, and thus the parameter adjustment unit 33A advances the processing to step S22.

On the other hand, if the accumulation time fixed flag is OFF (S34: Yes), the parameter adjustment unit 33A subtracts (e.g., −1) from the accumulation time configured in the data output unit 22 and configures the resultant accumulation time (S36), configures the search flag to ON (S37), and advances the processing to step S15.

In step S35, the parameter adjustment unit 33A determines whether the search flag is OFF. As a result, if the search flag is not OFF (S35: No), this means that an accumulation time in which data loss did not occur has already been found, and thus the parameter adjustment unit 33A advances the processing to step S22.

On the other hand, if the search flag is OFF (S35: Yes), this means that data loss occurs in the case where the accumulation time is equal to the reference cycle, and that occurrence of data loss cannot be prevented without changing the data transmittance, and thus the parameter adjustment unit 33A configures the accumulation time fixed flag to ON (S38), subtracts (e.g., −10%) from the data transmittance and configured the resultant data transmittance in the shaping unit 35 (S39), and thereafter advances the processing to step S15.

Next, an example of the list table in the case where the accumulation time configuring processing has been performed and the accumulation time and data transmittance that are determined in that case will be described with reference to FIG. 9.

The list table in FIG. 9 is an example of the case where application performance is configured to be prioritized and the reference time is configured to 2 seconds.

In the case where application performance is configured to be prioritized and the reference time is configured to 2 seconds, an entry having an accumulation time equal to the reference cycle of 2 seconds is the only entry stored in the list table 60, as shown in FIG. 9, as a result of the accumulation time configuring processing. Also, the data transmittance (50% in the example in FIG. 9) obtained by subtracting until data loss no longer occurs is stored in the data transmittance 54. In this case, 2 seconds, which is an accumulation time equal to the reference cycle, is determined as the accumulation time to be used, and a data transmittance of 50% is configured in the shaping unit 35. Data can thereby be stored in the data storage apparatus 12 at a data transmittance at which data loss does not occur, with the accumulation time configured to the reference cycle. In this case, although some of the data from the data source device 11 is shaped, the latest data obtained after the shaping can be stored in the data storage apparatus 12 every reference cycle, and thus the real-time performance of the data utilization apparatus 13 can be appropriately supported.

Next, a data processing system according to a modification will be described.

FIG. 11 is a configuration diagram of the data processing system according to the modification. Note that functional units similar to the data processing system shown in FIG. 1 are given the same reference symbols.

A data processing system 20B according to the modification includes a gateway 71 and a server 70 coupled to each other via a network 75.

The gateway 71 includes a data reception unit 72, a data output unit 73, and a test data generation unit 74.

The data reception unit 72 performs processing for receiving data transmitted from the data source device 11 and storing the received data in a buffer (first buffer) in the gateway 1. The data output unit 73 transmits the data stored in the buffer to the server 70 in accordance with the configuration of the time for which data is accumulated before being transmitted (accumulation time). The test data generation unit 74 performs processing for generating test data in accordance with the test data configurations and passing the generated test data to the data reception unit 72.

The server 70 includes a data reception unit 21, a data output unit 22, a processing unit 30B, and a configuring unit 40. Note that the data reception unit 21 performs processing for receiving data transmitted from the gateway 71 rather than from the data source device 11 and storing the received data in a buffer (second buffer).

The processing unit 30B includes a loss detection unit 31B, a throughput detection unit 32B, and a parameter adjustment unit 33B. The loss detection unit 31B detects the occurrence of data loss whereby input data cannot be stored in the buffers by the data reception unit 21 and the data reception unit 72. The throughput detection unit 32B detects the throughput of data output by the data output unit 22 and the data output unit 73. The parameter adjustment unit 33B executes accumulation time determination processing for adjusting the parameters (data accumulation time) of both the data output unit 22 and the data output unit 73. Note that the accumulation time determination processing performs similar processing to the accumulation time determination processing shown in FIG. 4 for both the gateway 71 and the server 70.

According to this data processing system 20B, the accumulation time for data that is output from the gateway 71 to the server 70 can also be appropriately determined.

Note that the present invention is not limited to the above-described embodiments, and can be appropriately implemented in modified form without departing from the spirit of the invention.

For example, in the above embodiments, the accumulation time configuring processing is configured such that the accumulation time is determined by inputting test data, but the present invention is not limited thereto, and the accumulation time may, for example, be determined by inputting actual data from the data source device.

Also, in the above embodiments, some or all of the processing performed by a processor may be performed by a dedicated hardware circuit. Also, programs in the above embodiments may be installed from a program source. The program source may be a program distribution server or a recording medium (e.g., portable recording medium).

What is claimed is:

1. A data-processing system that executes processing for receiving data, storing the received data in a buffer, and outputting the data stored in the buffer to a predetermined data storage destination, the data-processing system comprising one or more processors, wherein the one or more processors are configured to:

(a) receive a reference cycle that defines how frequently data stored in the data storage destination is to be referred to;

(b) sequentially determine, as a plurality of candidate accumulation times, respective times that are each equal to or shorter than the reference cycle, by gradually subtracting from the reference cycle;

(c) for each of the plurality of candidate accumulation times, control output of the data stored in the buffer in accordance with that candidate accumulation time and detect whether data loss occurs whereby data to be stored in the buffer cannot be stored in the buffer;

(d) select, from among the plurality of candidate accumulation times, a shortest candidate accumulation time at which the data loss does not occur, and determine the selected shortest candidate accumulation time as an accumulation time for holding the data in the buffer before outputting the data to the data-storage destination; and (e) output the data stored in the buffer to the data storage destination in accordance with the accumulation time determined in step (d).

2. The data processing system of claim 1, wherein, when data loss occurs for an accumulation time equal to the reference cycle, the one or more processors determine the time equal to the reference cycle to be the accumulation time.

3. The data processing system of claim 2, wherein the one or more processors are further configured to:

(a) perform, in accordance with a data transmittance indicating a rate of data to be stored in the buffer among input data, thinning processing for thinning the input data and store, in the buffer, data obtained after the thinning processing;

(b) detect whether data loss occurs after a change in the data transmittance; and (c) determine a data transmittance, for which the data loss does not occur, as a data transmittance to be used thereafter.

4. The data processing system of claim 1, wherein the one or more processors are configured to receive a configuration of test data to be used as input data, and generate test data conforming to the configuration, and use the generated test data as the input data.

5. The data processing system of claim 1, comprising:

a gateway; and a server coupled to each other via a network, wherein the gateway is configured to receive input data, store the input data in a first buffer, and output data stored in the first buffer to the server, the server is configured to receive data from the gateway, store the received data in a second buffer, and output data stored in the second buffer to the data-storage destination, and the one or more processors are configured to determine;

(i) a first accumulation time, for which data stored in the first buffer is held before being output to the server, and (ii) a second accumulation time, for which data stored in the second buffer is held before being output to the data storage destination, each accumulation time being equal to or shorter than the reference cycle and being determined based on whether data loss occurs in its respective buffer.

6. The data-processing system of claim 1, wherein, upon receiving an instruction prioritizing data-loss avoidance, the one or more processors determine as the accumulation time, a longest candidate accumulation time among a plurality of candidate accumulation times in which data loss does not occur.

7. The data-processing system of claim 1, wherein the one or more processors to detect whether data loss occurs by using actual data from a predetermined data source.

8. The data-processing system of claim 7, wherein, when an occurrence of data loss satisfies a predetermined condition, the one or more processors perform processing for reconfiguring the accumulation time.

9. The data-processing system of claim 1, wherein the one or more processors cause the determined accumulation time to be displayed.

10. A data-processing method performed by a data-processing system that receives data, stores the received data in a buffer, and outputs the data stored in the buffer to a predetermined data-storage destination, the method comprising:

(a) receiving a reference cycle that defines how frequently data stored in the data-storage destination is to be referred to;

(b) sequentially determining, as a plurality of candidate accumulation times, respective times that are each equal to or shorter than the reference cycle by gradually subtracting from the reference cycle;

(c) for each of the plurality of candidate accumulation times, controlling output of the data stored in the buffer in accordance with that candidate accumulation time and detecting whether data loss occurs whereby data to be stored in the buffer cannot be stored in the buffer;

(d) selecting, from among the plurality of candidate accumulation times, a shortest candidate accumulation time at which the data loss does not occur, and determining the selected shortest candidate accumulation time as an accumulation time; and (e) outputting the data stored in the buffer to the data-storage destination in accordance with the accumulation time determined in step (d).

11. A non-transitory recording medium storing a data-processing program that, when executed by a computer, causes the computer to perform the method of claim 10.

* * * * *